United States Patent
Jonsson et al.

(10) Patent No.: US 7,374,376 B2
(45) Date of Patent: May 20, 2008

(54) CUTTING TOOL (75) Inventors: Christer Jonsson, Hedemora (SE); Bengt Högrelius, Fagersta (SE); Jan Eriksson, Fagersta (SE); Christer Ejderklint, Fagersta (SE); Carl-Erik Berglöw, Fagersta (SE); Jorma Koskinen, Fagersta (SE); Jonas Boman, Falun (SE)

(73) Assignee: Seco Tools AB, Fagersta (SE)

( * ) Notice: Subject to any disclaimer, the term of this patent is extended or adjusted under 35 U.S.C. 154(b) by 375 days.

(21) Appl. No.: 11/162,633

(22) Filed: Sep. 16, 2005

(65) Prior Publication Data
US 2006/0072977 A1    Apr. 6, 2006

(30) Foreign Application Priority Data
Sep. 24, 2004    (SE) .................................... 0402324

(51) Int. Cl.
*B23B 31/11*    (2006.01)
(52) U.S. Cl. ........................ 408/233; 408/238; 407/53; 279/8
(58) Field of Classification Search ........ 408/231–233, 408/226, 238–239 A; 409/232, 234; 407/53, 407/54; 279/8; *B23B 31/11; B23C 5/26*
See application file for complete search history.

(56) References Cited

U.S. PATENT DOCUMENTS

| | | | |
|---|---|---|---|
| 1,407,335 A | | 2/1922 | Reynolds |
| 1,607,732 A | * | 11/1926 | Fletcher .................... 407/53 |
| 1,881,024 A | * | 10/1932 | Lang ......................... 175/327 |
| 2,328,602 A | | 9/1943 | Bechler |
| 2,898,787 A | * | 8/1959 | Hofbauer .................. 408/230 |
| 3,110,084 A | * | 11/1963 | Kinzbach .................. 408/231 |
| 4,093,395 A | * | 6/1978 | Luebbert et al. ........... 408/224 |
| 4,735,537 A | | 4/1988 | Rath |
| 4,854,788 A | * | 8/1989 | Okinaga .................... 408/59 |
| 5,114,286 A | | 5/1992 | Calkins |
| 5,598,751 A | | 2/1997 | Ochayon et al. |
| 5,899,642 A | | 5/1999 | Berglow et al. |
| 5,971,670 A | | 10/1999 | Pantzar et al. |
| 6,273,650 B1 | | 8/2001 | Jordberg |
| 6,485,220 B2 | | 11/2002 | Hecht |
| 6,565,291 B2 | | 5/2003 | Harpaz et al. |

(Continued)

FOREIGN PATENT DOCUMENTS

DE    2020951    4/1970

(Continued)

OTHER PUBLICATIONS

International Search Report for corresponding PCT/SE2005/001359.

*Primary Examiner*—Daniel W Howell
(74) *Attorney, Agent, or Firm*—WRB-IP LLP (57) ABSTRACT

The present invention relates to a replaceable cutting tip and, more particularly, to such cutting tips attachable to the cutting tip holders by a threaded connection. The cutting tip for a cutting tool includes a working end portion disposed along an axis of the cutting tip and including one or more cutting edges for machining a workpiece, and a mounting portion disposed along the axis of the cutting tip. The mounting portion includes a frustoconical supporting surface tip portion and a frustoconical threaded portion. The present invention also relates to a cutting tool per se.

26 Claims, 6 Drawing Sheets

U.S. PATENT DOCUMENTS

| | | |
|---|---|---|
| 6,637,985 B2 | 10/2003 | Pokolm |
| 7,070,367 B2 * | 7/2006 | Krenzer .................. 408/226 |
| 2001/0041089 A1 | 11/2001 | Hecht |
| 2002/0021945 A1 | 2/2002 | Harpaz et al. |

FOREIGN PATENT DOCUMENTS

| | | | |
|---|---|---|---|
| DE | 10137055 A1 | * | 2/2003 |
| DE | 102 05 635 A1 | | 8/2003 |
| EP | 661123 A1 | * | 7/1995 |
| FR | 2602162 A1 | * | 2/1988 |
| GB | 2265849 A | | 10/1993 |
| JP | 10249627 A | * | 9/1998 |
| WO | WO 03068436 A1 | * | 8/2003 |

\* cited by examiner

CUTTING TOOL

BACKGROUND AND SUMMARY

The present invention relates to cutting tools including replaceable cutting tips and, more particularly, to such cutting tools with the cutting tips attachable to the cutting tip holders by a threaded connection.

In making threaded connections between two parts, it is possible to permit faster connection of the parts by forming the internal and external threads in a cone or frustoconical shape. In this way, the externally threaded part does not have to be screwed into the internally threaded part from a leading end of the internally threaded part to its final position. Instead, the leading end of the externally threaded part can be inserted into the internally threaded part past internal threads at the leading end of the internally threaded part that define diameters that are larger than the diameter defined by the leading end of the externally threaded part. The leading end of the externally threaded part can be inserted into the internally threaded part up to the point where internal threads begin to contact the external threads. After this point, the externally threaded part is ordinarily turned only a few rotations relative to the internally threaded part before the two parts are in their final relative positions. It is desirable to minimize friction between the internally and externally threaded portions to permit the parts to be quickly turned to their final relative positions.

It is often extremely important in operations such as machining of metal or other workpieces that the location of a cutting edge of a cutting tool be precisely controlled and controllable. Complex machinery is provided to mill, drill, bore, or otherwise perform shaping operations on workpieces by precisely controlling the location of a cutting tool relative to the workpiece. Cutting tools often include replaceable inserts or cutting heads that are attached to permanent toolholders such as shanks that are moved relative to the workpiece.

The accuracy of the mounting of the cutting inserts or heads relative to the toolholder is a factor in the accuracy of the operation to be performed on the workpiece. In the case, for example, of a rotating tool, an insert or tool head that is displaced axially relative to a rotating shank to which it is attached can damage the workpiece and may necessitate the rejection of an expensive part. It is therefore desirable to minimize the possibility of movement of an insert or tool head relative to a toolholder. In many tools, threaded connections or portions of threaded connections form axial and/or radial supports or part of a radial and/or axial supporting arrangement for radially and/or axially supporting and positioning a tool head relative to a toolholder. Often, during cutting operations, substantial radial and axial forces are applied to threaded connections between a tool head and a toolholder, which can damage the threads.

In accordance with an aspect of the present invention, a cutting tip includes a working end portion disposed along an axis of the cutting tip and including one or more cutting edges for machining a workpiece, and a mounting portion disposed along the axis of the cutting tip and including a frustoconical supporting surface tip portion and a frustoconical threaded portion.

In accordance with another aspect of the present invention, a cutting tool includes a replaceable cutting tip including a working end portion disposed along an axis of the cutting tip and including one or more cutting edges for machining a workpiece, and a mounting portion disposed along the axis of the cutting tool and including a frustoconical supporting surface tip portion and a frustoconical threaded tip portion. The cutting tool also includes a cutting tip holder, the holder including a holder mounting portion including a frustoconical abutment surface holder portion for abutting the frustoconical supporting surface tip portion to position the cutting tip axially and radially in an operating position relative to the cutting tip holder and a frustoconical threaded holder portion for mating with the frustoconical threaded tip portion.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
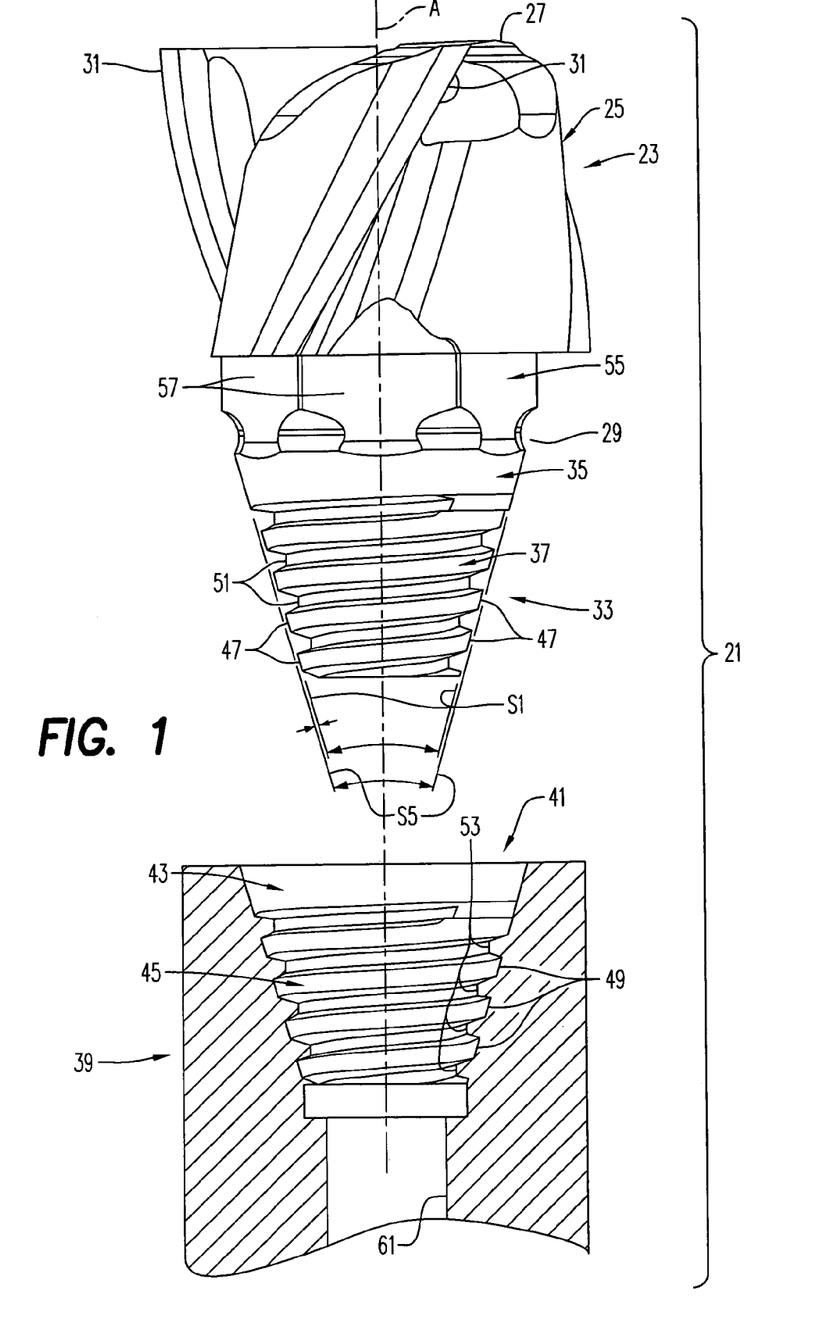
FIG. 1 is an exploded, side, partially cross-sectional view of a cutting tool according to an embodiment of the present invention.

A cutting tool 21 according to an embodiment of the present invention is shown in FIG. 1. The cutting tool 21 includes a replaceable cutting tip 23 including a working end portion 25 including a first end 27 and a second end 29. The replaceable cutting tip 23 is made of hard material, such as for example cemented carbide, e.g. tungsten carbide (WC) sintered together with cobalt (Co). The replaceable cutting tip 23 is molded or pressed and/or ground. The working end portion 25 is disposed along an axis A of the cutting tip 23 and includes one or more cutting edges 31 proximate the first end 27 for machining a workpiece (not shown). The cutting tip 23 also includes a mounting portion 33 disposed along the axis A of the cutting tool 21. The mounting portion 33 includes a frustoconical supporting surface tip portion 35 and a frustoconical threaded tip portion 37.

The cutting tool 21 also includes a cutting tip holder 39. The holder 39 includes a holder mounting portion 41 including a frustoconical abutment surface holder portion 43 for abutting the frustoconical supporting surface tip portion 35 to support and position the cutting tip axially and radially in an operating position (FIG. 2) relative to the cutting tip holder 39 and a frustoconical threaded holder portion 45 for mating with the frustoconical threaded tip portion 37.

Figure 2:
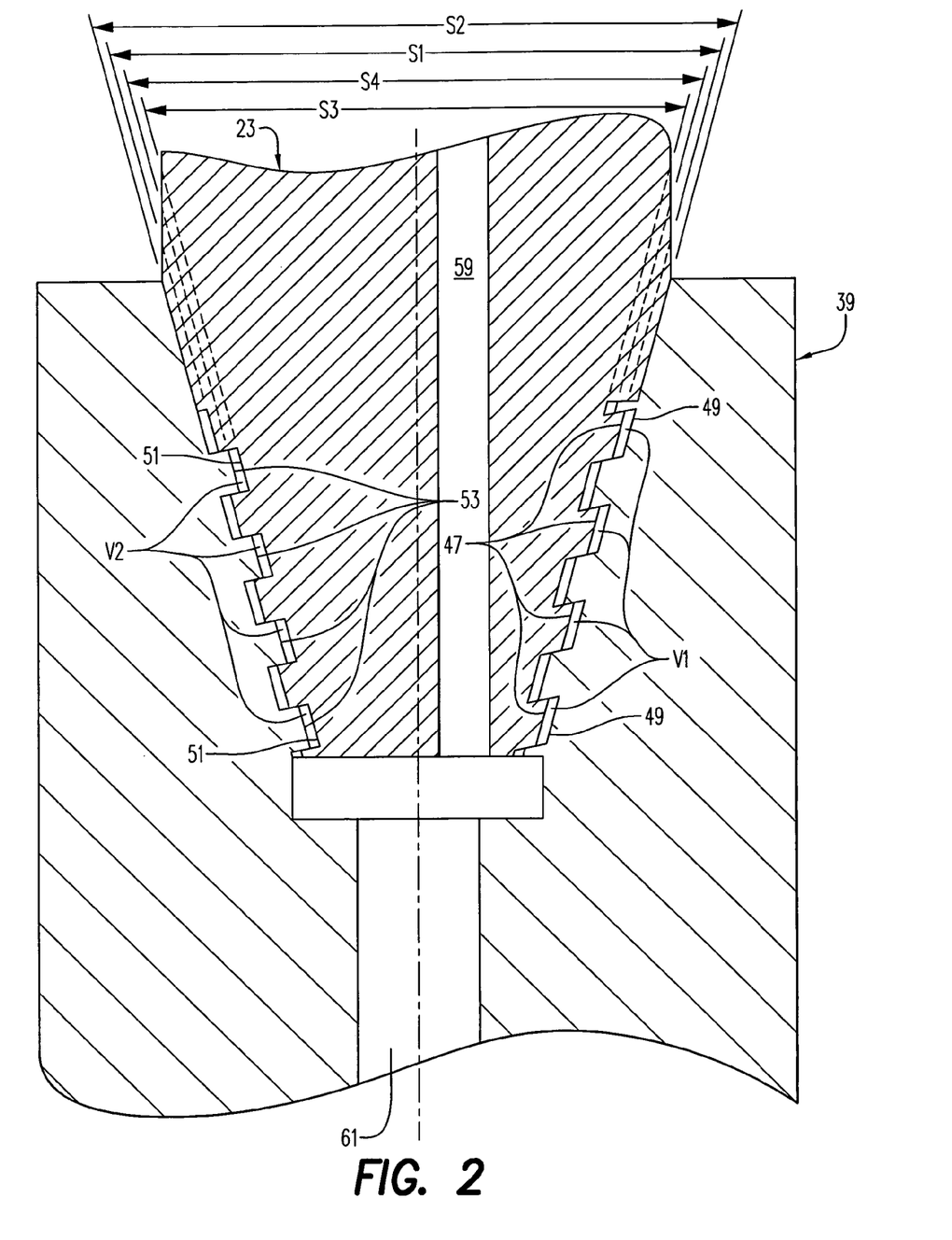
FIG. 2 is a side, cross-sectional view of a portion of an assembled cutting tool according to an embodiment of the present invention.

Ordinarily, when, as seen in FIG. 2, the cutting tip 23 is positioned in the operating position relative to the cutting tip holder 39, a space or volume V1 is defined between a first imaginary frustoconical surface S1 defined by radially outermost portions 47 of the frustoconical threaded tip portion 37 and a second imaginary frustoconical surface S2 defined by radially outermost portions 49 of the frustoconical threaded holder portion 45. Ordinarily, when the cutting tip 23 is positioned in the operating position relative to the cutting tip holder 39, a space or volume V2 is also or alternatively defined between a third imaginary frustoconical surface S3 defined by radially innermost portions 51 of the frustoconical threaded tip portions 37 and a fourth imaginary frustoconical surface S4 defined by radially innermost portions 53 of the frustoconical threaded holder portion 45.

In all or substantially all kinds of threaded connections, there is some minimal space between innermost and outermost thread surfaces. Compared with the usual spacing between innermost and outermost thread surfaces, the spaces V1 and/or V2 are large enough such that, by providing the space V1 and/or V2, there is reduced risk of damage to the extreme inner and outer portions of the threads when a force is exerted on the cutting tip or the cutting tip holder, and friction between the extreme inner and outer portions of the threads is reduced or eliminated. Radial forces on the cutting tip 23 can be borne entirely or substantially entirely by the frustoconical abutment surface holder portion 43 and the frustoconical supporting surface tip portion 35 instead of by the radially outermost and innermost portions of the threads. Axial forces on the cutting tip 23 can also be borne entirely or substantially entirely by the frustoconical abutment surface holder portion 43 and the frustoconical supporting surface tip portion 35 instead of by the threads, although some axial force on the threads may be desirable to hold the cutting tip securely relative to the cutting tip holder 39.

FIGS. 1 and 2 show the frustoconical supporting surface tip portion 35 and the frustoconical threaded tip portion 37 each having the same cone angle, just as the frustoconical abutment surface holder portion 43 and the frustoconical threaded holder portion 45 can also have the same cone angle. However, the frustoconical supporting surface tip portion and the frustoconical threaded tip portion, as well as the frustoconical abutment surface holder portion and the frustoconical threaded holder portion, can have the different cone angles (FIGS. 8-11). For example, the threaded portion of the tip or holder can have a greater or a lesser cone angle than the supporting or abutment surface portions of the tip or holder, respectively.

Figure 3:
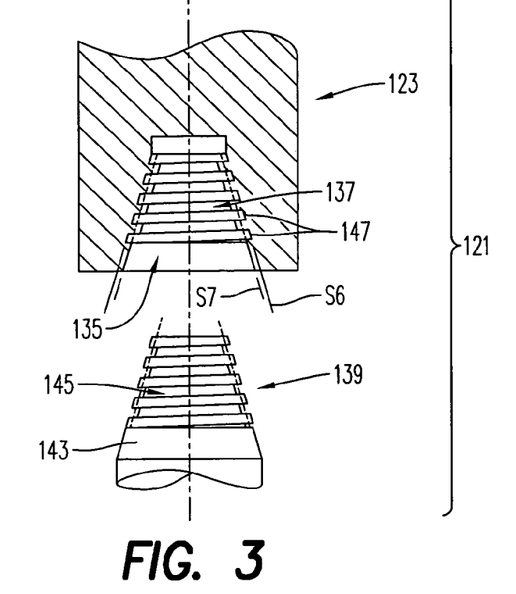
FIG. 3 is an exploded, side, partially cross-sectional view of a portion of a cutting tool according to an embodiment of the present invention.

In FIGS. 1 and 2, the first imaginary frustoconical surface S1 defined by the radially outermost portions 47 of the frustoconical threaded tip portion 37 may be disposed radially inwardly of the imaginary frustoconical surface S5 extending from the frustoconical supporting surface tip portion 35. The largest diameter of the frustoconical threaded tip portion 37 is disposed radially inwardly of the closest portion of the frustoconical supporting surface tip portion 35. In FIGS. 1 and 2, a cutting tip 23 with external threads, i.e., the threads face away from the axis A, and a cutting tip holder 39 with internal threads, i.e., the threads face toward the axis A, is shown. However, as seen in FIG. 3, a similar result can be achieved where the tool 121 may have a cutting tip 123 that may have internal threads 137 and the cutting tip holder 139 may have external threads 145. Thus, in FIG. 3, a first imaginary frustoconical surface S6 defined by radially outermost portions 147 of the frustoconical threaded tip portion 137 may be disposed radially outwardly of a second imaginary frustoconical surface S7 extending from the frustoconical supporting surface tip portion 135. A largest diameter of the frustoconical threaded tip portion 137 is disposed radially outwardly of the frustoconical supporting surface tip portion 135.

A variety of different permutations involving switching between internally or externally threaded portions on the cutting tip or the cutting tip holder are possible. For example, if desired, instead of the arrangement shown in FIG. 3, an internally threaded cutting tip may have the outermost portions of its threaded portion define an imaginary surface even with the imaginary surface extending from the frustoconical supporting surface while the externally threaded cutting tip holder may have a largest diameter portions of its threaded portion be disposed radially inward of a closest portion of the frustoconical abutment surface. Also, an internally threaded cutting tip may have a largest diameter portion of its threaded portion be disposed radially outward of a closest portion of the frustoconical supporting surface while the externally threaded cutting tip holder may have a largest diameter portion of its threaded portion 145 define an imaginary surface that is radially inward of a closest portion of the frustoconical abutment surface 143 as shown in phantom in FIG. 3.

Figure 4:
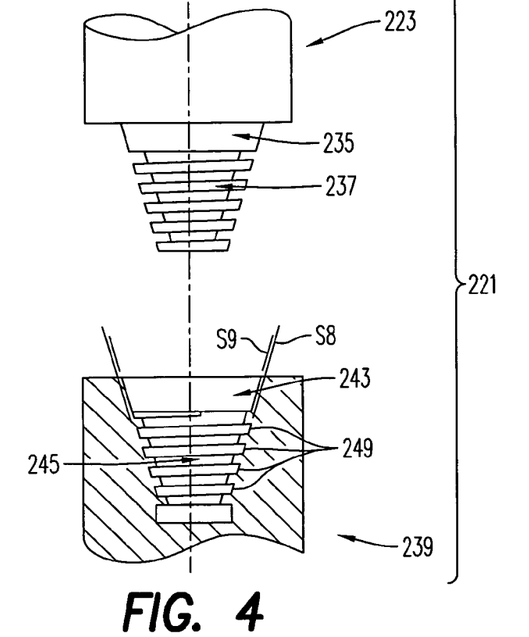
FIG. 4 is an exploded, side, partially cross-sectional view of a portion of a cutting tool according to an embodiment of the present invention.

Analogous variations can be provided when the cutting tip has external threads and the cutting tip holder has internal threads. For example, FIG. 4 shows a tool 221 with a cutting tip 223 having an externally threaded tip portion 237 and a supporting surface tip portion 235 and a cutting tip holder 239 having an internally threaded holder portion 245 and an abutment surface holder portion 243. Here, an imaginary surface S8 defined by radially outermost portions 249 of the internally threaded holder portion 245 is radially outward of an imaginary surface S9 extending from the abutment surface holder portion 243. A largest diameter portion of the internally threaded holder portion 245 is radially outward of a closest portion of the abutment surface holder portion 243.

Figure 5:
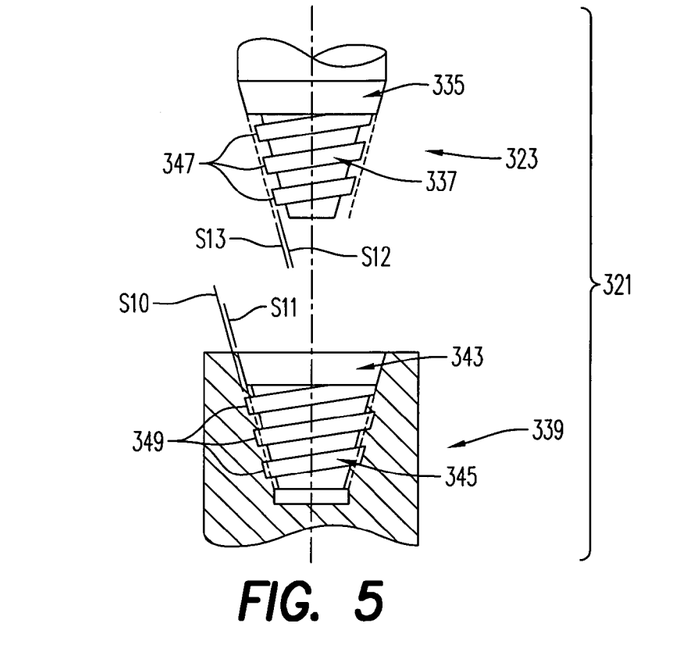
FIG. 5 is an exploded, side, partially cross-sectional view of a portion of a cutting tool according to an embodiment of the present invention.

FIG. 5 shows a tool 321 with a cutting tip 323 having an externally threaded tip portion 337 and a supporting surface tip portion 335 and a cutting tip holder 339 having an internally threaded holder portion 345 and an abutment surface holder portion 343. Here, an imaginary surface S10 defined by radially outermost portions 349 of the internally threaded holder portion 345 may be radially outward of an imaginary surface S11 extending from the abutment surface holder portion 343. A largest diameter portion of the internally threaded holder portion 345 is radially outward of a closest portion of the abutment surface holder portion 343. Also, an imaginary surface S12 defined by radially outermost portions 347 of the frustoconical threaded tip portion 337 may be radially inward of an imaginary surface S13 extending from the supporting surface tip portion 335. A largest diameter portion of the externally threaded tip portion 337 is radially inward of a closest portion of the supporting surface tip portion 335.

Figure 6:
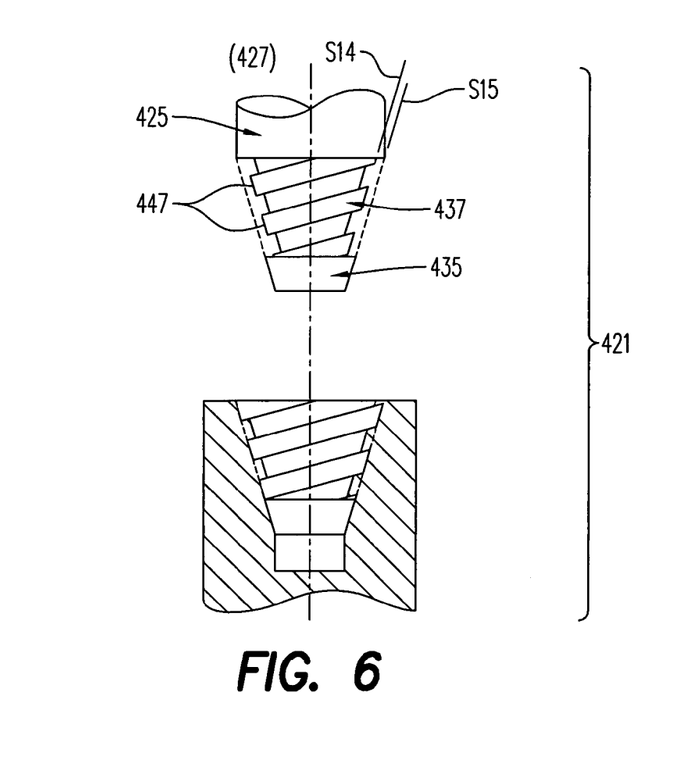
FIG. 6 is an exploded, side, partially cross-sectional view of a portion of a cutting tool according to an embodiment of the present invention.

In the embodiments seen in FIGS. 1-2, the frustoconical supporting surface tip portion 35 is closer to the first end 27 of the working end portion 25 than the frustoconical threaded tip portion 37. This is also true in the embodiments seen in FIGS. 3-5. However, if desired, as seen in FIG. 6, a frustoconical supporting surface tip portion 435 may be farther from the first end 427 of the working end portion 425 than the frustoconical threaded tip portion 437. In the tool 421 having a frustoconical supporting surface tip portion 435 farther from the first end 427 of the working end portion 425 than the frustoconical threaded tip portion 437, an imaginary surface S14 defined by radially outermost portions 447 of the frustoconical threaded tip portion 437 may be radially inward of an imaginary surface S15 extending from the supporting surface tip portion 435. The smallest diameter portion of the frustoconical threaded tip portion 437 is disposed radially inward of the closest portion of the supporting surface tip portion 435.

In other embodiments, a tool with a frustoconical supporting surface tip portion farther from the first end of the working portion of the tool than the frustoconical threaded tip portion can vary in much the same way that the tools with the frustoconical supporting surface tip portion closer to the first end of the working portion of the tool than the frustoconical threaded tip portion as in the embodiments discussed in FIGS. 1-5. In other words, the largest diameter of internal threads of the cutting tip holder may be radially outside of the closest portion of the abutment surface of the cutting tip holder; the largest diameter of internal threads of the cutting tip may be radially outside of the closest portion of the supporting surface of the cutting tip; the largest diameter of external threads of the cutting tip holder may be radially inside the closest portion of the abutment surface of the cutting tip holder; the largest diameter of external threads of the cutting tip may be radially inside the closest portion of the supporting surface of the cutting tip, etc.

Turning, specifically, to the cutting tip, as seen in FIGS. 1 and 2, a cutting tip 23 can include a non-circular surface portion 55. The non-circular surface portion 55 may be useful for securing the cutting tip 23 to the cutting tip holder 39 by means of a tool such as a wrench and the non-circular surface may include, for example, a plurality of flat surfaces 57, such as a hexagon.

The cone angle(s) of the supporting surface 35 and the threaded portion 37 may be the same or different. Ordinarily, the cone angle(s) will be greater than or equal to 15° and less than or equal to 30°.

Figure 7:
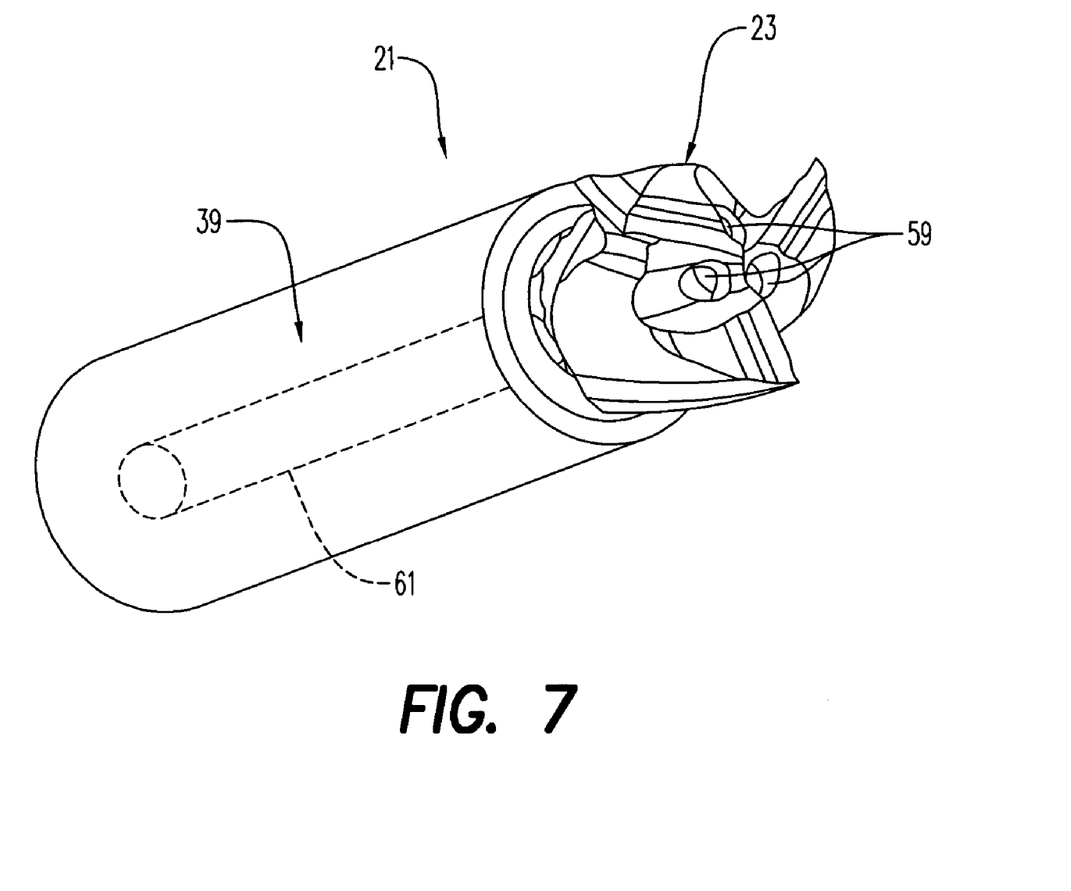
FIG. 7 is a perspective view of a cutting tool according to an embodiment of the present invention.

As seen in FIGS. 2 and 7, the cutting tip 23 may include one or more flushing channels 59 extending through the cutting tip from a first axial end of the cutting tip to a second axial end of the cutting tip. The cutting tip holder 39 may include one or more flushing channels 61 communicating with the flushing channel 59 in the cutting tip 23. Lubricant or coolant may be introduced to the point where the cutting tip 23 contacts a workpiece through the flushing channels 59 and 61.

Figure 8:
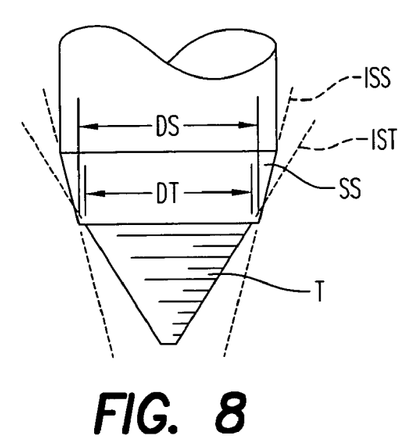
FIG. 8 is a schematic side view of an externally threaded portion of a cutting tool according to an embodiment of the present invention.
Figure 9:
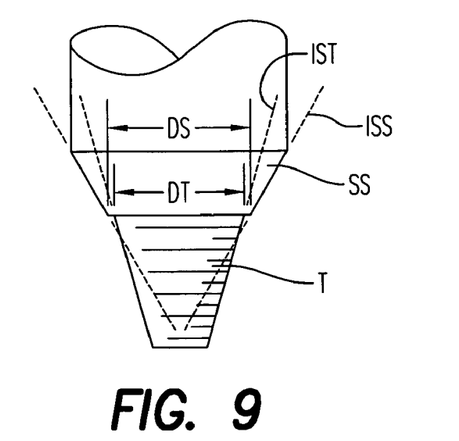
FIG. 9 is a schematic side view of an externally threaded portion of a cutting tool according to an embodiment of the present invention.
Figure 10:
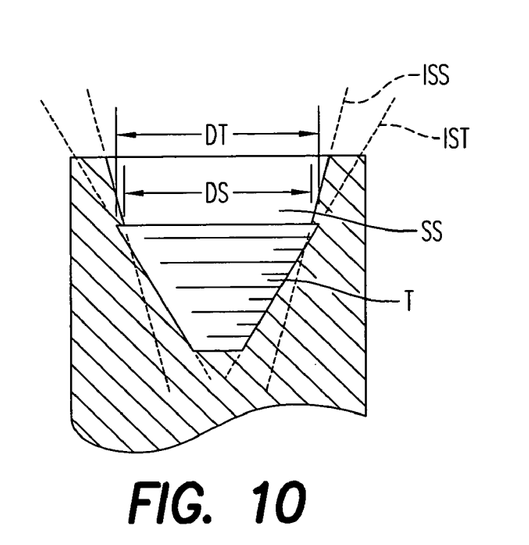
FIG. 10 is a schematic side view of an internally threaded portion of a cutting tool according to an embodiment of the present invention.
Figure 11:
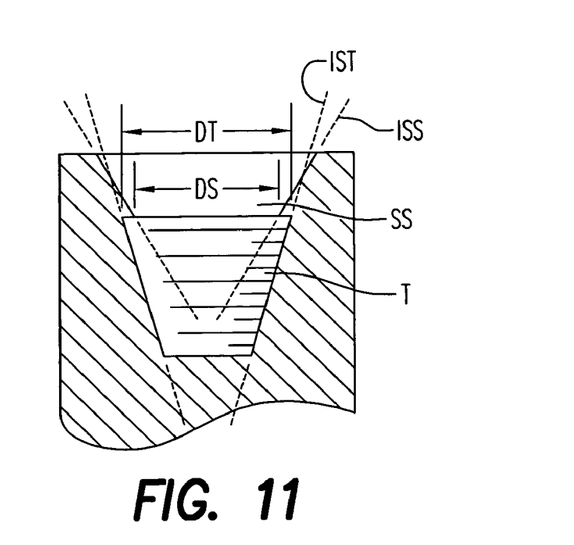
FIG. 11 is a schematic side view of an internally threaded portion of a cutting tool according to an embodiment of the present invention.

In the embodiments described thus far, real and imaginary frustoconical surfaces have been described as being "radially inward" or "radially outward" of other real or imaginary frustoconical surfaces. In some cases, however, such as where a cone angle of an internally or externally threaded portion is less than or greater than the cone angle of a supporting or abutment surface portion as shown in FIGS. 8-11 the imaginary surface IST extending from the outermost portions of the threaded portion T will intersect the abutment or supporting surface SS (or the imaginary surface ISS extending from the abutment or supporting surface) so that part of the imaginary extension IST from the threaded portion T is radially outside of the abutment or supporting surface SS or the imaginary surface ISS of the abutment or supporting surface, and part of the imaginary extension IST from the threaded portion T is radially inside of the abutment or supporting surface SS or the imaginary surface ISS of the abutment or supporting surface. In FIGS. 8 and 9, showing externally threaded components, the largest diameter DT of the threaded portion T is smaller than the smallest diameter DS of the closest portion of the abutment or supporting surface SS, i.e., more than merely a change of cone angle. In FIGS. 10 and 11, showing internally threaded components, the largest diameter DT of the threaded portion T is larger than the smallest diameter DS of the closest portion of the abutment or supporting surface SS, i.e., more than merely a change of cone angle. The internally and externally threaded components intended to mate with the externally and internally threaded components with radially offset threaded and abutment or supporting surfaces of FIGS. 8-11 may but need not also have radial offsets between threaded and supporting and abutment surfaces.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A cutting tip, comprising:
   a working end portion disposed along an axis of the cutting tip and including one or more cutting edges for machining a workpiece; and
   a mounting portion disposed along the axis of the cutting tip,
wherein the mounting portion includes a frustoconical supporting surface tip portion and a frustoconical threaded portion, and wherein the frustoconical supporting surface tip portion provides axial support for the cutting tip relative to a cutting tip holder, wherein a largest diameter portion of the frustoconical threaded portion is disposed radially outwardly of a closest portion of the frustoconical supporting surface tip portion.

2. A cutting tip, comprising:
   a working end portion disposed along an axis of the cutting tip and including one or more cutting edges for machining a workpiece; and
   a mounting portion disposed along the axis of the cutting tip,
wherein the mounting portion includes a frustoconical supporting surface tip portion and a frustoconical threaded portion, and wherein the frustoconical supporting surface tip portion provides axial support for the cutting tip relative to a cutting tip holder, wherein the frustoconical supporting surface tip portion and the frustoconical threaded portion each have the same cone angle.

3. The cutting tip as set forth in claim 2, wherein a largest diameter portion of the frustoconical threaded portion is disposed radially inwardly of a closest portion of the frustoconical supporting surface tip portion.

4. A cutting tool, comprising:
   a replaceable cutting tip including a working end portion disposed along an axis of the cutting tip and including one or more cutting edges for machining a workpiece, and a mounting portion disposed along the axis of the cutting tool, wherein the mounting portion includes a frustoconical supporting surface tip portion and a frustoconical threaded tip portion, and wherein a cutting tip holder includes a holder mounting portion including a frustoconical abutment surface holder portion for abutting the frustoconical supporting surface tip portion to position the cutting tip axially and radially in an operating position relative to the cutting tip holder and a frustoconical threaded holder portion for mating with the frustoconical threaded tip portion, wherein the frustoconical supporting surface tip portion and the frustoconical threaded tip portion each have the same cone angle.

5. The cutting tool as set forth in claim 4, wherein the frustoconical supporting surface tip portion and the frustoconical threaded tip portion face outwardly away from the axis of the cutting tip.

6. The cutting tip as set forth in claim 2, wherein the cutting tip further comprises a non-circular surface portion.

7. The cutting tip as set forth in claim 6, wherein the non-circular surface includes a plurality of flat surfaces.

8. The cutting tip as set forth in claim 2, wherein a cone angle of at least one of the frustoconical supporting surface tip portion and the frustoconical threaded portion is greater than or equal to 15° and less than or equal to 30°.

9. The cutting tip as set forth in claim 2, wherein the cutting tip further comprises one or more flushing channels extending through the cutting tip from a first axial end of the cutting tip to a second axial end of the cutting tip.

10. The cutting tip as set forth in claim 2, wherein the working end portion includes a first end proximate the one or more cutting edges and a second end and the frustoconical supporting surface tip portion is closer to the first end of the working end portion than the frustoconical threaded portion.

11. The cutting tip as set forth in claim 2, wherein the working end portion includes a first end proximate the one or more cutting edges and a second end and the frustoconical supporting surface tip portion is farther from the first end of the working end portion than the frustoconical threaded portion.

12. The cutting tip as set forth in claim 2, wherein the frustoconical supporting surface tip portion and the frustoconical threaded portion face inwardly toward the axis of the cutting tip.

13. The cutting tip as set forth in claim 2, wherein the frustoconical supporting surface tip portion and the frustoconical threaded portion face outwardly away from the axis of the cutting tip.

14. The cutting tip as set forth in claim 2, wherein the frustoconical supporting surface tip portion provides radial support for the cutting tip relative to a cutting tip holder.

15. The cutting tool as set forth in claim 4, wherein the frustoconical supporting surface tip portion and the frustoconical threaded tip portion face inwardly toward the axis of the cutting tip.

16. The cutting tool as set forth in claim 4, wherein, when the cutting tip is positioned in the operating position relative to the cutting tip holder, a space is defined between a first imaginary frustoconical surface defined by radially outermost portions of the frustoconical threaded tip portions and a second imaginary frustoconical surface defined by radially outermost portions of the frustoconical threaded holder portion.

17. The cutting tool as set forth in claim 16, wherein, when the cutting tip is positioned in the operating position relative to the cutting tip holder, a space is defined between a third imaginary frustoconical surface defined by radially innermost portions of the frustoconical threaded tip portions and a fourth imaginary frustoconical surface defined by radially innermost portions of the frustoconical threaded holder portion.

18. The cutting tool as set forth in claim 4, wherein, when the cutting tip is positioned in the operating position relative to the cutting tip holder, a space is defined between a first imaginary frustoconical surface defined by radially innermost portions.

19. The cutting tool as set forth in claim 4, wherein the working end portion includes a first end proximate the one or more cutting edges and a second end and the frustoconical supporting surface tip portion is farther from the first end of the working end portion than the frustoconical threaded tip portion.

20. The cutting tool as set forth in claim 4, wherein the working end portion includes a first end proximate the one or more cutting edges and a second end and the frustoconical supporting surface tip portion is closer to the first end of the working end portion than the frustoconical threaded tip portion.

21. The cutting tool as set forth in claim 4, wherein a largest diameter portion of the frustoconical threaded tip portion is disposed radially inwardly of a closest portion of the frustoconical supporting surface tip portion.

22. The cutting tool as set forth in claim 21, wherein a largest diameter portion of the frustoconical threaded holder portion is disposed radially outwardly of a closest portion of the frustoconical abutment surface holder portion.

23. The cutting tool as set forth in claim 4, wherein a largest diameter portion of the frustoconical threaded tip portion is disposed radially outwardly of a closest portion of the frustoconical supporting surface tip portion.

24. The cutting tool as set forth in claim 23, wherein a largest diameter portion of the frustoconical threaded holder portion is disposed radially inwardly of a closest portion of the frustoconical abutment surface holder portion.

25. The cutting tool as set forth in claim 4, wherein a largest diameter portion of the frustoconical threaded holder portion is disposed radially inwardly of a closest portion of the frustoconical abutment surface holder portion.

26. The cutting tool as set forth in claim 4, wherein a largest diameter portion of the frustoconical threaded holder portion is disposed radially outwardly of a closest portion of the frustoconical abutment surface holder portion.

* * * * *